(12) United States Patent
Said et al.

(10) Patent No.: US 8,863,075 B2
(45) Date of Patent: Oct. 14, 2014

(54) AUTOMATED SUPPORT FOR DISTRIBUTED PLATFORM DEVELOPMENT

(75) Inventors: Bare Said, St. Leon-Rot (DE); Frank Jentsch, Muehlhausen (DE); Frank Brunswig, Heidelberg (DE)

(73) Assignee: SAP AG, Walldorf (DE)

( * ) Notice: Subject to any disclaimer, the term of this patent is extended or adjusted under 35 U.S.C. 154(b) by 567 days.

(21) Appl. No.: 13/207,151

(22) Filed: Aug. 10, 2011

(65) Prior Publication Data

US 2013/0042219 A1    Feb. 14, 2013

(51) Int. Cl.
*G06F 9/44* (2006.01)
*G06F 9/45* (2006.01)

(52) U.S. Cl.
CPC ........................ *G06F 8/436* (2013.01)
USPC ............ 717/104; 717/103; 717/107; 717/120

(58) Field of Classification Search
CPC ............... G06F 8/10; G06F 8/20; G06F 8/34; G06F 8/71; G06F 8/436
See application file for complete search history.

(56) References Cited

U.S. PATENT DOCUMENTS

| | | | |
|---|---|---|---|
| 7,225,432 B2 | 5/2007 | Jentsch et al. | |
| 7,225,433 B2 | 5/2007 | Jentsch et al. | |
| 7,315,853 B2 | 1/2008 | Brunswig et al. | |
| 7,454,660 B1 | 11/2008 | Kolb et al. | |
| 7,480,920 B2 | 1/2009 | Brendle et al. | |
| 7,487,512 B2 | 2/2009 | Brunswig et al. | |
| 7,533,103 B2 | 5/2009 | Brendle et al. | |
| 7,536,673 B2 | 5/2009 | Brendle et al. | |
| 7,676,816 B2 | 3/2010 | Brunswig et al. | |
| 7,685,114 B2 | 3/2010 | Brunswig et al. | |
| 7,685,268 B2 | 3/2010 | Brunswig et al. | |
| 7,685,568 B2 | 3/2010 | Brendle et al. | |
| 7,698,174 B2 | 4/2010 | Brunswig et al. | |
| 7,702,650 B2 | 4/2010 | Brunswig et al. | |
| 7,725,907 B2 | 5/2010 | Bloching et al. | |
| 7,730,412 B2 | 6/2010 | Said | |
| 7,765,494 B2 | 7/2010 | Brunswig et al. | |
| 7,769,821 B2 | 8/2010 | Brunswig et al. | |
| 7,770,146 B2 | 8/2010 | Brunswig et al. | |
| 7,774,463 B2 | 8/2010 | Bloching et al. | |
| 7,778,965 B2 | 8/2010 | Bindewald et al. | |
| 7,797,370 B2 | 9/2010 | Brunswig et al. | |

(Continued)

OTHER PUBLICATIONS

SAP, OData in a Nutshell, Aug. 2011, 19 pages.*

(Continued)

*Primary Examiner* — Thuy Dao
(74) *Attorney, Agent, or Firm* — Fish & Richardson P.C.

(57) ABSTRACT

The present disclosure describes methods, systems, and computer program products for semantically analyzing modeled objects. One method includes identifying an object model created in a distributed development system for semantic analysis, where the distributed development system is associated with a software platform. The identified object model is then semantically analyzed based on a predetermined algorithm. A set of at least one pre-existing object models associated with the software platform is compared to the semantically analyzed object model, and a level of semantic overlap between the semantically analyzed object model and each of the set of at least one pre-existing object models is determined. In some instances, the predetermined algorithm may be selected based on and correspond to the object model type of the identified object model. The set of at least one preexisting object models may comprise a subset of pre-existing object models available in a development system or associated with a software platform.

24 Claims, 7 Drawing Sheets

(56) References Cited

U.S. PATENT DOCUMENTS

| | | | |
|---|---|---|---|
| 7,801,996 B2 | 9/2010 | Brunswig et al. | |
| 7,810,102 B2 | 10/2010 | Brendle et al. | |
| 7,823,120 B2 * | 10/2010 | Kazakov et al. | 717/104 |
| 7,840,944 B2 | 11/2010 | Brunswig et al. | |
| 7,844,615 B2 | 11/2010 | Brunswig et al. | |
| 7,865,900 B2 | 1/2011 | Aakolk et al. | |
| 7,877,695 B2 | 1/2011 | Brunswig et al. | |
| 7,890,959 B2 | 2/2011 | Brunswig et al. | |
| 7,900,190 B2 | 3/2011 | Brunswig et al. | |
| 7,900,216 B2 | 3/2011 | Brunswig et al. | |
| 7,908,248 B2 | 3/2011 | Brunswig et al. | |
| 7,917,524 B2 | 3/2011 | Brunswig et al. | |
| 7,930,251 B2 | 4/2011 | Bloching et al. | |
| 7,966,603 B2 | 6/2011 | Brunswig et al. | |
| 7,984,020 B2 | 7/2011 | Brunswig et al. | |
| 7,996,814 B1 * | 8/2011 | Qureshi et al. | 717/120 |
| 8,719,770 B2 * | 5/2014 | Balani et al. | 717/104 |
| 2005/0021557 A1 | 1/2005 | Brendle et al. | |
| 2005/0022157 A1 | 1/2005 | Brendle et al. | |
| 2005/0091276 A1 | 4/2005 | Brunswig et al. | |
| 2005/0138113 A1 | 6/2005 | Brendle et al. | |
| 2006/0080426 A1 | 4/2006 | Brunswig et al. | |
| 2006/0242207 A1 * | 10/2006 | Tsyganskiy et al. | 707/203 |
| 2007/0006041 A1 | 1/2007 | Brunswig et al. | |
| 2007/0061431 A1 | 3/2007 | Brunswig et al. | |
| 2007/0073702 A1 | 3/2007 | Brunswig et al. | |
| 2007/0100943 A1 | 5/2007 | Brunswig et al. | |
| 2007/0124740 A1 | 5/2007 | Brunswig et al. | |
| 2007/0157167 A1 | 7/2007 | Brendle et al. | |
| 2007/0226751 A1 | 9/2007 | Brendle et al. | |
| 2007/0233728 A1 | 10/2007 | Puteick et al. | |
| 2007/0271107 A1 | 11/2007 | Fiedler et al. | |
| 2007/0288885 A1 * | 12/2007 | Brunel et al. | 717/104 |
| 2008/0005623 A1 | 1/2008 | Said | |
| 2008/0010074 A1 | 1/2008 | Brunswig et al. | |
| 2008/0120597 A1 | 5/2008 | Brunswig et al. | |
| 2008/0147455 A1 | 6/2008 | Brunswig et al. | |
| 2008/0148166 A1 | 6/2008 | Brunswig et al. | |
| 2008/0244616 A1 | 10/2008 | Brunswig et al. | |
| 2008/0301628 A1 * | 12/2008 | Lochmann | 717/107 |
| 2009/0019424 A1 | 1/2009 | Klein et al. | |
| 2009/0144721 A1 | 6/2009 | Wagner et al. | |
| 2009/0150473 A1 | 6/2009 | Brunswig et al. | |
| 2011/0066660 A1 | 3/2011 | Aakolk et al. | |
| 2012/0072884 A1 * | 3/2012 | Balko et al. | 717/104 |
| 2013/0042219 A1 * | 2/2013 | Said et al. | 717/103 |

OTHER PUBLICATIONS

Ferreira et al., Patterns for Data and Metadata Evolution in Adaptive Object-Models, 2008, 9 pages.*

SAP, BusinessObjects Metadata Management User's Guide, 2009, 416 pages.*

U.S. Appl. No. 10/744,384, filed Dec. 17, 2003, Brendle et al.
U.S. Appl. No. 10/747,020, filed Dec. 23, 2003, Brendle et al.
U.S. Appl. No. 10/954,904, filed Sep. 30, 2004, Brunswig et al.
U.S. Appl. No. 10/963,337, filed Oct. 11, 2004, Brunswig et al.
U.S. Appl. No. 10/963,487, filed Oct. 12, 2004, Brunswig et al.
U.S. Appl. No. 12/975,096, filed Dec. 21, 2010, Jentsch et al.
U.S. Appl. No. 12/975,813, filed Dec. 22, 2010, Brunwig et al.
U.S. Appl. No. 12/980,170, filed Dec. 28, 2010, Ritter et al.
U.S. Appl. No. 13/162,442, filed Jun. 16, 2011, Said et al.

* cited by examiner

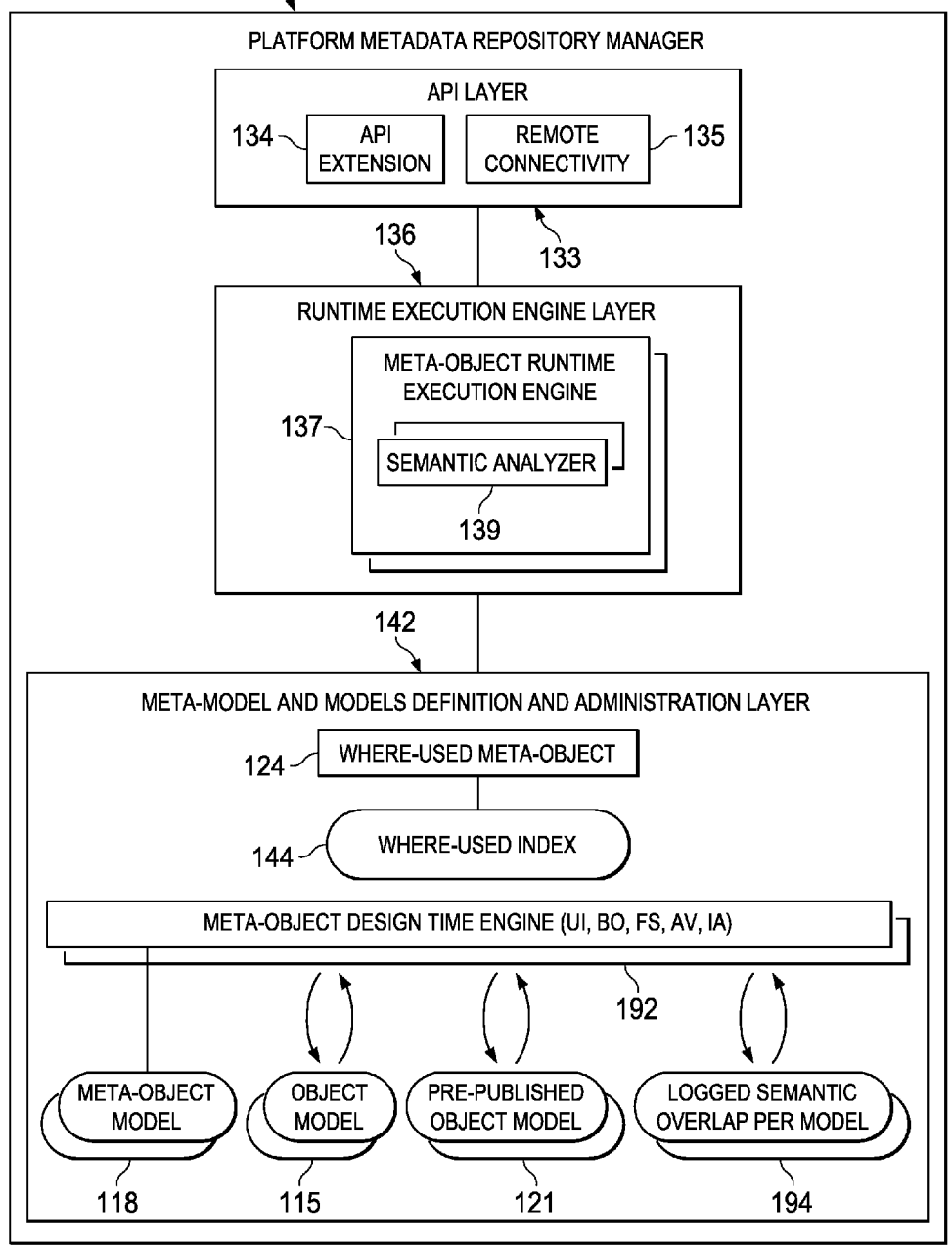

AUTOMATED SUPPORT FOR DISTRIBUTED PLATFORM DEVELOPMENT

TECHNICAL FIELD

The present disclosure relates to software, computer systems, and computer-implemented methods for distributed platform development.

BACKGROUND

Software development in a distributed enterprise development environment involves tens, hundreds, or thousands of developers each working on different portions of the same, or related, applications. Many of these development processes follow a well-defined development process, particularly when developed on top of an existing platform or base application. Strictly defined development processes are used to provide maximum benefit from advantages based on platform-level software development. While the strictly defined development process can provide for similar development, it is difficult to ensure that different developers refrain from creating and using individually designed, but overlapping software objects, models, and other code. At the present, comparison of new objects and/or coding may be made to check for similar technical names of previously-developed objects or other code within a centralized catalog.

SUMMARY

The present disclosure describes methods, systems, and computer program products for semantically analyzing modeled objects. One method includes identifying an object model created in a distributed development system for semantic analysis, where the distributed development system is associated with a software platform. The identified object model is then semantically analyzed based on a predetermined algorithm. A set of at least one pre-existing object models associated with the software platform is compared to the semantically analyzed object model, and a level of semantic overlap between the semantically analyzed object model and each of the set of at least one pre-existing object models is determined. In some instances, the predetermined algorithm may be selected based on and correspond to the object model type of the identified object model. The set of at least one pre-existing object models may comprise a subset of pre-existing object models available in a development system or associated with a software platform.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1B is a more detailed illustration of an example platform metadata repository manager.

DETAILED DESCRIPTION

Figure 1A:
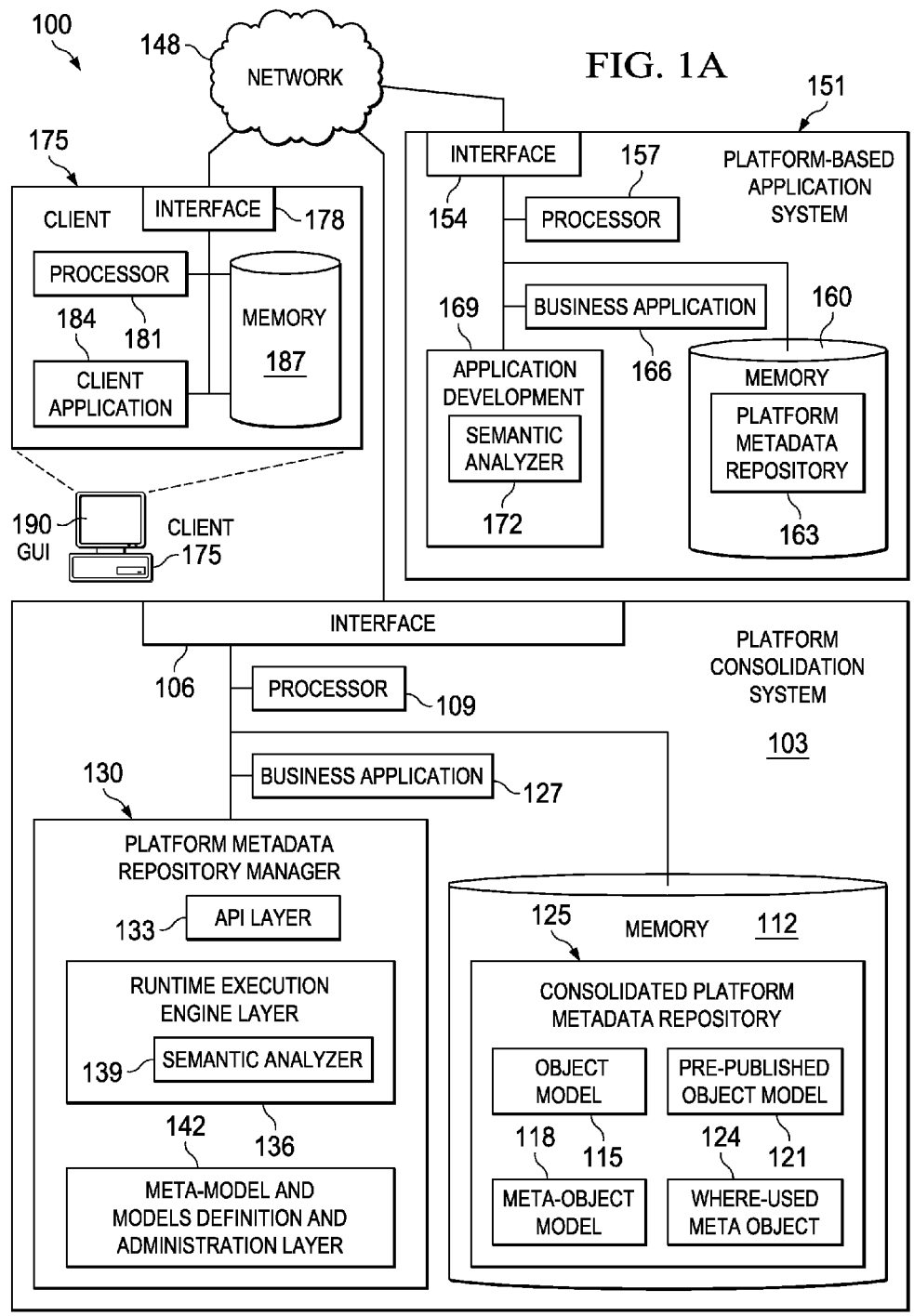
FIG. 1A illustrates an example environment for implementing various features of a system providing automated support for distributed platform development.

This disclosure generally relates to software, computer systems, and computer-implemented methods for distributed platform development. Specifically, tools and methods are used to perform a semantic analysis of newly generated object models created in a distributed development environment, and allowing the results of the analysis to be compared to one or more previously generated models used or created in an associated consolidated platform development system. Additionally, object models generated in and for other applications and environments can be compared to the newly generated object models, as well using a pre-publishing method. The present disclosure can reduce the development costs by allowing developers to identify previously-generated objects and their associated models based on the design, structure, and inherent characteristics of a newly defined object. In addition to reducing the effort in programming and developing applications in a platform-based environment, the present disclosure also reduces the number of issues that may occur from different versions of the same, similar, or related object models.

Software products can be built upon a platform, where the platform is used as a basis upon which multiple applications are developed. As one example, SAP AG's On-Demand Business Process Platform can be used to create many on-demand products, as well as network applications (NWAs) that leverage the underlying platform using a well-defined development process. Well-defined development processes can provide numerous advantages to platform-based software development. First, applications built on top of the platform can be built quickly based on their leveraging of the underlying and available services provided by the platform. Additionally, the platform can benefit by the application development because services and features designed for and available to a new application can be retrofitted to the platform layer and become part of the platform services and features. The retrofitted services and features can then be exposed as platform functionality and subsequently leveraged by other new applications. Retrofitted functionality and features may not be restricted to technical and technology services, but can often be business application content used to build standard business processes, such as Sales Order Processing.

Content development within the platform and within the applications based upon the platform can follow specific modeling methodologies shared across all layers of the related applications within the development environment. In one example, the modeling methodology can be supported by a metadata-centric development infrastructure used to ensure consistency and integrity of business application content. In doing so, it is possible to develop homogenous, consistent, and consolidated business content across the platform and its derivative applications. A strong governance process can be established in order to coordinate the distributed development, and can further reveal and avoid semantic overlap between semantic-oriented development artifacts and objects (e.g., business objects, data types, etc.) created in the platform or its related applications. By reducing and/or avoiding semantic overlap within the development ecosystem, simpler retrofits of previously-generated content can be performed. The governance process can be automated in order to maximize the speed of the development process, thereby reducing human interaction and review. The solution described here supports a distributed development in different layers and/or systems by automatically analyzing the semantics of created entities within the different systems and comparing them with entities originally created in the platform layer, other application systems, and/or a local system. Detected semantic overlap can be identified by the automated process, with the affected objects and/or entities being brought to the attention of the developer. Further, one or more previously generated entities or objects can be suggested as possible replacements for the affected object and/or entity, or as a starting point for further development.

FIG. 1A illustrates an example environment 100 for implementing various features of a system providing automated support for distributed platform development. The illustrated environment 100 includes, or is communicably coupled with, a platform consolidation system 103, at least one platform-based application system 151, and at least one client 175. At least some of the communications between the platform consolidation system 103, the platform-based application system(s) 151, and the clients 175 may be performed across or via network 148. In general, environment 100 depicts an example configuration of a system for analyzing newly developed entities and/or objects with one or more preexisting entities or objects available in related systems, such as the platform consolidation system 103 or another platform-based application system 151. As illustrated, entities created within the application development module 169 of the platform-based application system 151 are compared with the existing entities associated with the environment 100 using the semantic analyzer 172. The semantic analyzer 172 can compare the newly created entity with local entities and/or objects in a local platform metadata repository 163, as well as those included in a consolidated platform metadata repository (PMRS) 125. The semantic analyzer 172 can identify one or more previously existing entities that are semantically similar to the newly created or defined entity or object, and provide suggestions to the developer for using the preexisting entities or objects instead of the newly defined version. With these suggestions, semantically overlapping entities can be avoided so that developers can streamline the development process and reuse and retrofit existing entities into new applications and functionality. The environment 100 is an example, and in alternative implementations, the elements illustrated in FIG. 1A may be included in or associated with different and/or additional servers, clients, networks, and locations other than those as shown. For example, one or more of the components illustrated within the platform consolidation system 103 may be located in multiple or different servers, cloud-based networks, or other locations accessible to the platform consolidation system 103 (e.g., either directly or indirectly via network 148).

In general, the platform consolidation system 103 is any server or system that stores, manages, and executes functionality associated with a PMRS 125 and an associated PMRS manager 130. Additionally, the platform consolidation system 103 may execute one or more business applications 127. For example, each platform consolidation system 103 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each platform consolidation system 103 may store a plurality of various applications, while in other instances, platform consolidation systems 103 may be dedicated servers meant to store and execute the PMRS manager 130 for a particular platform or application and its related functionality. In some instances, the platform consolidation system 103 may comprise a web server or be communicably coupled with a web server, where one or more of the business applications 127 associated with the platform consolidation system 103 represent web-based (or web-accessible) applications accessed and executed through requests and interactions received on the client 175, executing a client application 184 operable to interact with the programmed tasks or operations of the corresponding PMRS manager 130 or one or more business applications 127.

At a high level, the platform consolidation system 103 comprises an electronic computing device operable to receive, transmit, process, store, or manage data and information associated with the environment 100. The platform consolidation system 103 illustrated in FIG. 1A can be responsible for receiving application requests from one or more clients 175 (as well as any other entity or system interacting with the platform consolidation system 103, including desktop or mobile client systems), responding to the received requests by processing said requests in the PMRS manager 130 and/or the associated business application 127, and sending the appropriate responses from the appropriate component back to the requesting client 175 or other requesting system. Components of the platform consolidation system 103 can also process and respond to local requests from a user locally accessing the system 103. Accordingly, in addition to requests from the clients 175 illustrated in FIG. 1A, requests associated with a particular component may also be sent from internal users, external or third-party customers, and other associated business applications, business processes, as well as any other appropriate entities, individuals, systems, or computers. In some instances, either or both of the PMRS manager 130 and the business application 127 may be web-based applications executing functionality associated with a networked or cloud-based business process.

As used in the present disclosure, the term "computer" is intended to encompass any suitable processing device. For example, although FIG. 1A illustrates a single platform consolidation system 103, environment 100 can be implemented using any number of servers, as well as computers other than servers, including a server pool. Indeed, the platform consolidation system 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated platform consolidation system 103 may be adapted to execute any operating system, including Linux, UNIX, Windows, Mac OS, or any other suitable operating system.

In the illustrated implementation of FIG. 1A, the platform consolidation system 103 includes an interface 106, a processor 109, a memory 112, a business application 127, and the PMRS manager 130. In some instances, the platform consolidation system 103 and its illustrated components may be separated into multiple components executing at different servers and/or systems. For example, while FIG. 1A illustrates the business application 127 and the PMRS manager 130 as separate components, other example implementations can include the PMRS manager 130 within a separate system, as well as within as part of the business application's inherent functionality. Thus, while illustrated as a single component in the example environment 100 of FIG. 1A, alternative implementations may illustrate the business application server 103 as comprising multiple parts or portions accordingly.

FIG. 1A depicts a server-client environment, but could also represent a cloud computing network. Various other implementations of the illustrated environment 100 can be provided to allow for increased flexibility in the underlying system, including multiple platform consolidation systems 103 performing or executing one or more additional or alternative instances of the PMRS manager 130 and associated with a consolidated PRMS 125 for one or more different platforms, as well as multiple instances of the business application 127 and its related functionality. In those instances, the different platform consolidation systems 103 may communicate with each other via a cloud-based network or through the connections provided by network 148.

The interface 106 is used by the platform consolidation system 103 to communicate with other systems in a client-server or other distributed environment (including within environment 100) connected to the network 148 (e.g., one of the clients 175, one or more platform-based application systems 151, as well as other systems communicably coupled to the network 148). The interface 106 generally comprises logic encoded in software and/or hardware in a suitable combination and operable to communicate with the network 148. More specifically, the interface 106 may comprise software supporting one or more communication protocols associated with communications such that the network 148 or the interface's hardware is operable to communicate physical signals within and outside of the illustrated environment 100.

Generally, the platform consolidation system 103 may be communicably coupled with a network 148 that facilitates wireless or wireline communications between the components of the environment 100 (i.e., between the platform consolidation system 103 and different platform-based application systems 151 and/or one or more clients 175), as well as with any other local or remote computer, such as additional clients, servers, or other devices communicably coupled to network 148, including those not illustrated in FIG. 1A. In the illustrated environment, the network 148 is depicted as a single network, but may be comprised of more than one network without departing from the scope of this disclosure, so long as at least a portion of the network 148 may facilitate communications between senders and recipients. In some instances, one or more of the components associated with the platform consolidation system 103 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can comprise either a wireline or wireless link. Example wireless links may include 802.11a/b/g/n, 802.20, WiMax, and/or any other appropriate wireless link. In other words, the network 148 encompasses any internal or external network, networks, sub-network, or combination thereof operable to facilitate communications between various computing components inside and outside the illustrated environment 100. The network 148 may communicate, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1A, the platform consolidation system 103 includes a processor 109. Although illustrated as a single processor 109 in the platform consolidation system 103, two or more processors may be used in the platform consolidation system 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the platform consolidation system 103 and, specifically, the functionality associated with the corresponding business application 127 and the PMRS manager 130. In one implementation, the server's processor 109 executes the functionality required to receive and respond to requests and instructions from the client 175 and platform-based application systems 151, as well as the functionality required to perform the operations of the associated business application 127 and the PMRS manager 130, among others.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1A are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding PMRS manager 130 and the business application 127 stored on the associated platform consolidation system 103. In some instances, a particular platform consolidation system 103 may be associated with the execution of two or more business applications 127 (and other related components), as well as one or more distributed applications executing across two or more servers executing the functionality associated with the platform consolidation system 103.

At a high level, each business application 127 is any application, program, module, process, or other software that may execute, change, delete, generate, or otherwise manage information associated with a particular platform consolidation system 103, and in some cases, a business process performing and executing business process-related events. In particular, business processes communicate with other users, applications, systems, and components to send, receive, and process events. In some instances, a particular business application 127 may operate in response to and in connection with one or more requests received from an associated client 175 or other remote client. Additionally, a particular business application 127 may operate in response to and in connection with one or more requests received from other business applications 127 external to the platform consolidation system 103. In some instances, the business application 127 may request additional processing or information from an external system or application. In some instances, each business application 127 may represent a web-based application accessed and executed by remote clients 175 via the network 148 (e.g., through the Internet, or via one or more cloud-based services associated with the business application 127). Further, while illustrated as internal to the platform consolidation system 103, one or more processes associated with a particular business application 127 may be stored, referenced, or executed remotely. For example, a portion of a particular business application 127 may be a web service that is remotely called, while another portion of the business application 127 may be an interface object or agent bundled for processing at a remote system (not illustrated), a particular platform-based application system 151, or a particular client 175 (e.g., the client application 184). Moreover, any or all of a particular business application 127 may be a child or sub-module of another software module or enterprise application (not illustrated) without departing from the scope of this disclosure. Still further, portions of the particular business application 127 may be executed or accessed by a user working directly at the platform consolidation system 103, as well as remotely at a corresponding client 175.

The illustrated business application 127 may be created and developed based on an underlying software platform or platform layer, which can be used to provide underlying functionality defined by the platform, as well as additional functionality available by building software applications upon the platform layer using components and entities originally designed for use with the platform. By creating the additional functionality, the platform can be extended and added to by a plurality of developers, providing for a fluid means of enhancement. In some instances, additional applications can be built on top of the original system by many different developers and development teams to create new products and software. The PMRS manager 130 and its corresponding consolidated PMRS 125 can maintain a metadata repository storing information on the various models and their associated definitions and metadata across an entire development ecosystem.

The PMRS 125 enables the semantic consolidation of models created in the platform system, as well as those created in additional applications based upon the underlying platform that are developed in distributed platform-based application systems 151. The PMRS 125 and its associated PMRS manager 130 offer functionality to analyze and compare the semantics of models created in distributed development environments. The analysis and comparison can be triggered at the platform consolidation system 103, as well as at remote platform-based application systems 151. In some instances, some or all of the PMRS 125 can be made available to each remote platform-based application system 151, either by providing access to the consolidated PMRS 125 by one or more application development modules 169 located at the remote systems, or by pushing or providing copies of the PMRS 125 to the remote systems for local storage. In some instances, models created at one remote platform-based application system 151 can be provided to other platform-based application systems 151, either directly or after consolidation at the platform consolidation system 103. In other words, models created in any of the related systems based on the platform, and not just at the platform consolidation system 103, can be made available throughout the development ecosystem.

In some instances, the analysis and comparison of a newly created model or entity can be performed locally with the version of the consolidated PMRS 163 stored at the particular system, while in others, the analysis and comparison can be performed at the platform consolidation system 103. The semantic analysis can be triggered when a new model or entity is created in a system (either the platform consolidation system 103 or a particular platform-based application system 151). The semantic representation of the newly created model can be compared with the semantic representations of all of (or a portion thereof) existing models having the same defined category as the newly created model. For instance, a newly created business object can be compared to all other available business objects, while a newly created user interface (UI) can be compared against all other UIs.

Models created at the platform consolidation system 103 and at each of the platform-based application systems 151 can be published to one or more locations, such that updated sets of the existing models can be provided to both the platform consolidation system 103 and each remote platform-based application system 151 on a consistent basis. In some instances, new models can be pre-published to the consolidation system and stored within the PMRS 125. The PMRS manager 130 can manage the distribution of metadata defining the pre-published models to the other application systems 151, allowing the various application systems 151 to maintain local PMRSs 163 that provide the metadata for local semantic analyses. In some instances, pre-published model metadata can be provided directly from one platform-based application system 151 to another, without first sending the model metadata to the consolidation system 103. In one implementation, only metadata used to define the model, and not runtime artifacts, are included in the pre-published information shared among the systems. Runtime artifacts are not pre-published in these instances, as the approach enables an easy and complete sharing of pre-published metadata suitable for performing the appropriate semantic analyses and comparisons. When a semantic analysis is performed, either at the consolidated system 103 or a particular platform-based application system 151, all available metadata models (both locally defined and pre-published) may be compared to the newly created model or entity.

The PMRS manager 130 may include multiple layers of functionality, including those illustrated in FIG. 1A, and the more detailed illustrated in FIG. 1B. For example, the PMRS manager 130 of FIG. 1A includes three layers, an API layer 133, a runtime execution engine layer 136, and a meta-model and models definition and administration layer 142. In general, the API layer 133 provides one or more application programming interfaces (APIs) to the platform-based application systems 151 and clients 175 for accessing the operations of the PMRS manager 130 remotely. In some instances, use of one or more APIs at the API layer 133 can allow for pre-publishing of one or more models to and/or from the platform consolidation system 103 of FIG. 1A, as well as using the semantic analyzer 139 of the platform consolidation system 103 to perform the analysis of a newly created model or entity. As illustrated in FIG. 1B, the API layer 133 can include a set of API extensions 134 as well as remote connectivity module 135. The API extensions 134 and remote connectivity module 135 can combine to provide access to one or more pre-published models within the consolidated system 103, as well as allow for remote semantic analysis to be performed by one or more of the platform-based application systems 151. Using these components, an application development module 169 within a particular application system 151 can access the semantic analyzer 139 of the runtime execution engine layer 136.

The runtime execution engine layer 136 can provide runtime support for the PMRS manager 130 and the accessibility to the consolidated PMRS 125, including the operations of the semantic analyzer 139. The runtime execution engine layer 136 can perform initial determinations of the current meta-object or model being analyzed at runtime. The semantic analyses performed by the semantic analyzer 139 can be tailored to the particular category of meta-object being analyzed, such that a determination of the category is the appropriate first operation of the analysis. Examples of possible objects include user interfaces, business objects, analytical views, inbound and/or outbound agents, and others. Once the particular category of object is determined or identified, the semantic analyzer 139 can apply the appropriate algorithm to the object to perform the semantic analysis. In some instances, the semantic analyzer 139 may be a part of the runtime execution engine layer's inherent functionality, while in others, the semantic analyzer 139 may be a distinct component associated with the runtime execution engine layer 136. The runtime execution engine layer 136 may further include transactional services to create and administer business object and other entity instances, and lifecycle service to manage object lifecycles. Some services of the runtime execution engine layer 136 may provide access to object instances exposed by the API layer 133. As illustrated in FIG. 1B, the runtime execution engine layer 136 may include one or more meta-object runtime execution engines 137 associated with different categories of objects within the development ecosystem. Each particular meta-object runtime execution engine 137 may provide its own particular semantic analyzer 139 to be used for analyses corresponding to a particular category.

The meta-model and models definition and administration layer ("model layer") 142 can perform operations associated with the identifying meta-object models, object models, and object instances associated with a particular PMRS 125. Generally, the model layer 142 includes meta object models providing descriptions of various object models used in the platform and one or more platform-based application systems. The object models may be provided with the underlying platform, while in other instances, the object models may be incorporated into the PMRS 125 after their creation in one of the platform-based application systems 151. The model layer 142 can illustrate or describe one or more logical dependencies between existing models, as well as provide access to each of the models themselves. Meta-object models include business objects and communication interfaces. To instantiate these object models, a design time engine is used to model and define instances of a particular meta-object model, and a runtime engine is used to process and execute those instances. Particular instances of meta-object models are object models, such as a business partner object model or a sales order business object model. For each meta-object model, a corresponding design time engine and runtime engine may exist (i.e., meta-object runtime execution engine 137 and meta-object design time engine 192). As illustrated in FIG. 1B, the model layer 142 can include a plurality of object-related components and sets of data. For example, FIG. 1B illustrates the model layer 142 as including a where-used meta-object 124 and its corresponding where-used index 144, one or more meta-object design time engine instances 192, one or more meta-object models 118, one or more object models 115, one or more pre-published object models 121, and a set of logged semantic overlap results per model 194.

The where-used meta-object 124 and the where-used index 144 provide descriptions and information on where particular meta-objects and objects are used within the platform and/or within the platform-based applications. The where-used meta-object 124 may be an instantiated version of the where-used index 144. Using the where-used meta-object 124 (or the where-used index 144), the locations of where a particular object is associated can be identified, the dependencies with one or more other meta-objects can be defined, and the current or previous instantiated versions of particular meta-objects can be determined. In some instances, the users or clients who have recently or are currently using a particular meta-object can be identified. If information associated with the particular meta-object is modified by one user, reference to the where-used meta-object 124 (or the where-used index 144) can be used to determine where particular objects can be accessed.

The model layer 142 can also include one or more instantiations of particular meta-object design time engines 192, which may include or allow execution of instantiations of such objects as user interfaces, business objects, fast searches, analytical views, and inbound agents, among others. The meta-object design time engines 192 can instantiate one or more meta-object models 118 and object models 115 defining the various objects and/or entities.

The model layer 142 can also include one or more pre-published object models 121. These pre-published object models 121 may be available in the consolidated system 103 even if those models 121 are not part of the platform. The pre-published object models 121 can be received and/or retrieved from one or more platform-based application systems 151 where the models 121 were originally created. These models 121 can contain only metadata without requiring additional runtime artifacts to be received/retrieved from the corresponding remote application systems 151. In addition to the models, in some instances the results of a semantic analysis of the pre-published model 121 may also be available within the consolidated system 103 and used in later analyses.

The illustrated model layer 142 in FIG. 1B includes the set of logged semantic overlap results per model 194. These components include logged results of semantic analyses performed on the corresponding models, both run locally at the platform consolidation system 103 or remotely at one or more of the platform-based application systems 151. The logged results 194 can provide information and documentation on known semantic overlap between different models, including information on what overlap can be temporarily tolerated in response to a semantic analysis or rules that may allow for certain levels of accepted overlap. This logged information can be considered during additional analyses or exposed to other systems via the API layer 133. In some instances, a dedicated semantic overlap logging component (not illustrated) may be available in either the consolidation system 103 or the platform-based application systems 151, such that the analysis results can be logged. In some instances, the logging component may be included within the centralized semantic analyzer 139 or one or more of the remote semantic analyzers 172.

FIG. 1A further includes memory 112. The memory 112 of the platform consolidation system 103 stores data and program instructions, as well as metadata associated with the consolidated PMRS 125. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects, object models, and data, including classes, frameworks, applications, backup data, business objects, jobs, web pages, web page templates, database tables, process contexts, repositories storing services local to the platform consolidation system 103, and any other appropriate information including any parameters, variables, algorithms, instructions, rules, constraints, or references thereto associated with the purposes of the platform consolidation system 103 and its functionality. In some implementations, including a cloud-based system, some or all of the memory 112 may be stored remote from the platform consolidation system 103, and communicably coupled to the platform consolidation system 103 for usage. As described above, memory 112 can include one or more meta-models associated with various objects included in or associated with the underlying platform and its related platform-based application systems 151. Specifically, memory 112 can store the consolidated PMRS 125. Some or all of the elements illustrated within memory 112 may be stored external to the memory 112. As illustrated, the PMRS 125 can include a plurality of object models 115, meta-object models 118, pre-published object models 121, and where-used meta-objects 124, among others. These items are made accessible to the PMRS manager 130 as illustrated in FIG. 1B.

The platform-based application systems 151 of FIG. 1A represent one or more systems for executing business applications 166 that are, at least in part, based on the platform associated with the platform consolidation system 103. While illustrated as a separate system to the platform consolidation system 103, in some instances one or more of the platform-based application systems 151 may exist within the platform consolidation system 103. The platform-based application systems 151 as illustrated include an interface 154, a processor 157, a business application 166, a memory 160, and an application development module 169. The interface 154, processor 157, and memory 160 may be similar to interface 106, processor 109, and memory 112, respectively, of the platform consolidation system 103. The business application 166 can represent an application built using one or more objects, elements, and other development objects provided by or associated with the platform. The business application 166 may also include one or more objects created at one or more of the platform-based application systems 151, separate from the platform. Those objects, and other development-related operations, can be created using the application development module 169.

The application development module 169 can include one or more development frameworks and/or tools, and can be used to extend, manipulate, and modify the platform to create new and/or distinct applications. When new objects are created, the semantic analyzer 172 associated with the application development module 169 can be used to perform a remote semantic analysis of the newly created object. In some instances, the application development module 169 can access a local PMRS 163 included in memory 160. The PMRS 163 can be a local version of the consolidated PMRS 125 that is updated by receiving and/or retrieving the pre-published models from the platform consolidation system 103 and/or one or more other platform-based application systems 151. The local PMRS 163 may include different sets of information as compared to the consolidated PMRS 125 in some instances, including subsets of the PMRS 125, as well as information that has not yet been included within the PMRS 125 that is created locally at the application development module 169. When a new object is created, the semantic analyzer 172 can perform its analysis either on the local PMRS 163 or remotely on the consolidated PMRS 125 (via the API layer 133). Still further, in some instances the semantic analysis of the new object can be performed at the PMRS manager 130 of the platform consolidation system 103 instead of locally within the application system 151.

The illustrated environment 100 of FIG. 1A also includes one or more clients 175. The clients 175 may be associated with a particular business application or development context, as well as a particular platform-based application system 151. Each client 175 may be any computing device operable to connect to or communicate with at least one of the platform consolidation system 103 or a particular platform-based application system 151 using a wireline or wireless connection via the network 148, or another suitable communication means or channel. In some instances, the client 175 may be a part of or associated with a business process involving one or more of the business applications 127, 166, or alternatively, a remote developer of associated with the platform or a related platform-based application. In general, each client 175 includes a processor 181, an interface 178, a client application 184, a graphical user interface (GUI) 190, and a memory 187. In general, the client 175 comprises an electronic computer device operable to receive, transmit, process, and store any appropriate data associated with the environment 100 of FIG. 1A. It will be understood that there may be any number of clients 175 associated with, or external to, environment 100. For example, while illustrated environment 100 includes a single client 175, alternative implementations of environment 100 may include multiple clients communicably coupled to the one or more of the systems illustrated. In some instances, one or more clients 175 may be associated with administrators of the environment, and may be capable of accessing and interacting with the settings and operations of the PMRS manager 130, one or more business applications 127, 166, a particular application development module 169, and/or other components of the illustrated environment 100. Additionally, there may also be one or more additional clients 175 external to the illustrated portion of environment 100 capable of interacting with the environment 100 via the network 148. Further, the terms "client" and "user" may be used interchangeably as appropriate without departing from the scope of this disclosure. Moreover, while each client 175 is described in terms of being used by a single user, this disclosure contemplates that many users may use one computer, or that one user may use multiple computers.

The GUI 190 associated with each client 175 may comprise a graphical user interface operable to, for example, allow the user of a client 175 to interface with at least a portion of the business application 127, 166, PMRS manager 130, and/or a particular application development module 169 and their associated operations and functionality. Generally, the GUI 190 provides the particular user with an efficient and user-friendly presentation of business data provided by or communicated within the system. The GUI 190 may comprise a plurality of customizable frames or views having interactive fields, pull-down lists, and buttons operated by the user. For example, the GUI 190 may provide interactive elements that allow a user to interact with a particular component within and/or external to environment 100. Different portions of the corresponding component's functionality may be presented and accessible to the user through the GUI 190, such as through a client application 184 (e.g., a web browser). Generally, the GUI 190 may also provide general interactive elements that allow a user to access and utilize various services and functions of a particular component. In some instances, the client application 184 may be used to access various portions of different platform-based application systems 151 or the platform consolidation system 103. In some instances, the client application 184 may be an agent or client-side version of the business application 127, 166, or other suitable component. The GUI 190 may present the information of the client application 184 for viewing and interaction. In general, the GUI 190 is often configurable, supports a combination of tables and graphs (bar, line, pie, status dials, etc.), and is able to build real-time portals, where tabs are delineated by key characteristics (e.g., site or micro-site). Therefore, the GUI 190 contemplates any suitable graphical user interface, such as a combination of a generic web browser, intelligent engine, and command line interface (CLI) that processes information in the platform and efficiently presents the results to the user visually.

As used in this disclosure, each client 175 is intended to encompass a personal computer, touch screen terminal, workstation, network computer, kiosk, wireless data port, smart phone, personal data assistant (PDA), one or more processors within these or other devices, or any other suitable processing device. For example, each client 175 may comprise a computer that includes an input device, such as a keypad, touch screen, mouse, or other device that can accept user information, and an output device that conveys information associated with the operation of one or more business applications 127, 166, PMRS manager 130, or application development module 169, and/or the client 175 itself, including digital data, visual information, or the GUI 190. Both the input and output device may include fixed or removable storage media such as a magnetic storage media, CD-ROM, or other suitable media, to both receive input from and provide output to users of client 175 through the display, namely, the GUI 190. The client's processor 181, interface 178, and memory 187 may be similar to or different from those described in connection with the other components illustrated in FIG. 1A, although alternative implementations of one or more of these components may be used, as well as implementations where additional components may also be included.

Figure 2:
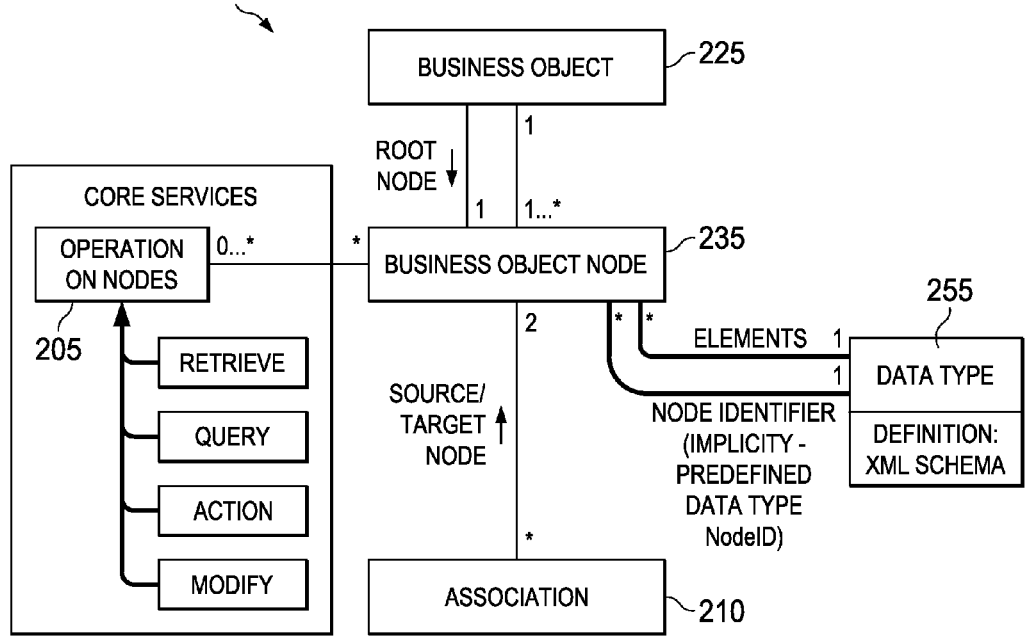
FIG. 2 provides an example illustration of a business object meta-model.

The business object meta-model provides an example of the meta-models used in an example platform development infrastructure. FIG. 2 provides an example illustration of a business object meta-model. In general, business objects encapsulate the business logic of standard enterprise resource planning business processes, among others. A business object is modeled following a strict modeling methodology using specific modeling elements, including Nodes, Node structures, Core Services, Cross and Intra BO associates, Actions, and further metadata, including UI Texts or properties attributes. Other categories of meta-models can include different modeling elements. These modeling elements are used to express and expose the business semantic of the business logic or business process parts handled by the modeled business object in a standardized manner. Instances of the above modeling elements can be named following well-defined naming rules in accordance to the semantic of the modeled business object.

FIG. 2 shows the business object meta-model 200 and the elements used to model a business object. A business object meta-model may provide for organizing attributes of a particular business object under nodes in a hierarchy. The root node 225 of the business object provides the head of the hierarchy of the business object, with one or more business object nodes (or client nodes) 235 associated with the root node 225 (directly or indirectly via one or more higher level nodes 235). Nodes 235 of the business object model can be in a directed relation to higher level nodes via a defined association 210. The associations of the business object node hierarchy are called compositions. Besides the compositions, additional associations between nodes can exist. When associations go across business object boundaries, they are called cross-business object associations. In some implementations, cross-BO associations may not be allowed in order to avoid tight coupling between business objects. Additional core services, including various operations on nodes 205 can be included in the model 200. For example, query services can be used to identify instances of business objects. A query can search for business object instances that match a defined parameter set. Other core services, as illustrated, can include retrieve services, action services, and modify services, used to interact with, identify, and manipulate particular nodes of a business object. Each business object node 235 can also be associated with one or more elements, each assigned a particular data type 255 and defined by a particular schema.

During a semantic model analysis and comparison run, the semantic analyzer decomposes a business object model in its individual modeling elements in order to perform a structured analysis and comparison. Semantic overlaps identified during the analysis can be weighted differently according to the modeling elements to which they belong. For example, an overlap on a root node name level may be weighted higher than an overlap on a child node level. In one example semantic overlap analysis for a business object, the following elements can be compared and considered:

Semantical name of the business object (e.g., Sales Order or Purchase Order).
    An Alternative Key used to identify a business object (e.g., alternative key for the business object Accounting Document, which may be composed of the following components: ID, Company UUID, SetOfBooksID, and FiscalYearID).
    The business object nodes of the business object, including:
        Semantical name of the node.
        Node element structures (i.e., not only the semantical name of the node structure, but how the nodes are composed).
    Business Object Actions, including:
        The semantical name of each action.
        The results structure or node structure associated with the results or effects of the action.
        The input parameter structure for each action.
    Used status and action management schemas, as the creation of these schemas also follows well-defined modeling rules.
    Used dependent objects. Depended objects are provided as reusable parts; therefore, the identifying of those parts during the semantic analysis provides leads per definition to the semantic overlap with all objects in which they are included.

As described above, the various considerations and elements can be associated with different weighting factors. For example, overlap of dependent objects may be weighted lower than overlap in business object nodes based on similar node element structures. Additionally, an aggregated higher weighting factor can be introduced when additional overlap has occurred, such as in a business object node where overlap occurs in both the semantical name and in action and associations defined to the node. It will be understood that the analysis algorithms and the weighting factors can be adjusted and extended manually, based on heuristics, and after simulations, particularly after using the large amount of business object content available in the platform layer of the system. In some instances, due to strictly defined modeling methodologies and rules the modeling elements used, such as nodes or associations, may be expected to be named similarly in the different systems where they are expressing similar semantic meanings. In those instances, an initial text-based comparison algorithm on individual elements may be sufficient to identify one or more overlapping and/or suggested pre-existing entities or models.

A local semantic overlap analysis can be executed in each system based on the platform development infrastructure. The consolidated and related business content of the platform and its platform-based application systems may be completely or at least partially available in both the platform consolidation system as well as in each remote application system. As such, models and entities created in the application systems can be analyzed and compared against the local PMRS stored at the application system. The local semantic analysis provides a locally executed detection of overlap with already released local content, as well as consolidated platform content. In some instances, models created in other application systems may not be considered until those models are integrated into the platform's functionality and/or until those models are pre-published to the local application system. Even if the content created by other application systems is not included in the local semantic analysis, the local execution of the analysis can provide great value to local developers by ensuring consistency and integrity of newly developed entities and models with the released platform content and other content stored locally at the local application system.

Pre-publishing of locally created models to the platform consolidation system and/or to one or more application systems can allow for a complete view of and semantic analysis of all related material and content available in the development ecosystem. In some instances, only the platform consolidation system may receive the pre-published models from each of the remote application systems. Therefore, a semantic analysis of a newly created object can be performed remotely at the platform consolidation system. This remote semantic overlap analysis can be performed asynchronously via a batch job or via explicit triggering upon request. The application system at which the newly created object is developed can send, via network connections, a set of metadata defining the newly created object. In some instances, the set of metadata may define the meta-model of the particular object, while in others, the set of metadata may include the results of an initial semantic analysis of the created object. The semantic analysis of the newly created object can then be performed at the platform consolidation system, with the newly created object being compared to each object in the platform of the same category. Results of the semantic analysis can be stored in memory by a logging component associated with the PMRS. Analysis results for a specific model can be retrieved via APIs available in the platform consolidation system's API layer, or remotely via one or more web services. In some instances, both for local and remote semantic analyses, exceptions can be declared, allowing specific overlap results to be ignored, modified, treated at a higher weighting, or other suitable operations.

Figure 3:
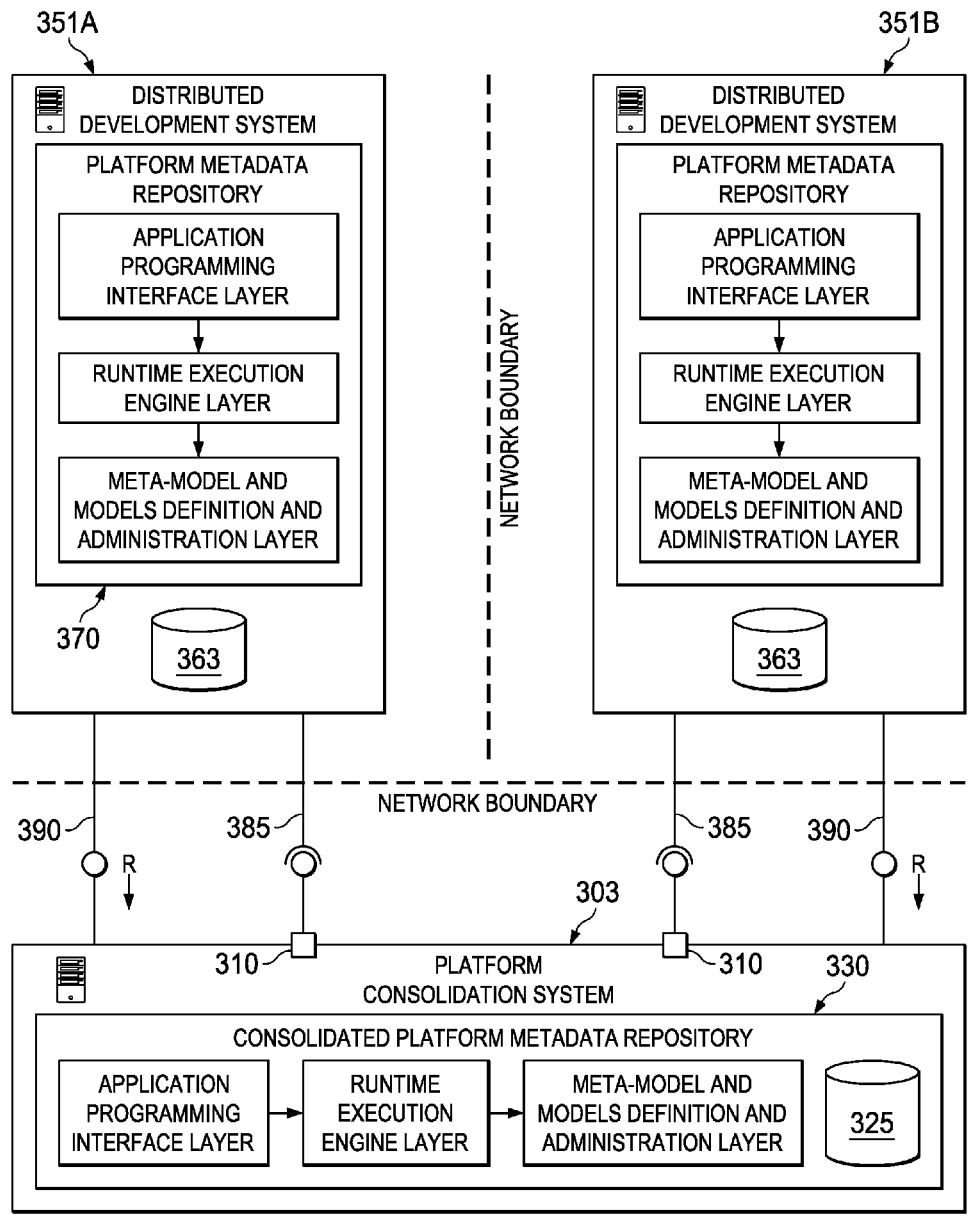
FIG. 3 illustrates an example development ecosystem including a plurality of distributed development systems and a centralized platform consolidation system.

FIG. 3 illustrates a development ecosystem 300 including a plurality of distributed development systems and a centralized platform consolidation system. The illustrated ecosystem allows each system to share models included within the base platform as well as those created at one of the distributed development systems 351A and B through the use of pre-publishing techniques. In some instances, the distributed development systems 351A and B may only directly pre-publish their content to the platform consolidation system 303. Other development systems can then retrieve those pre-published models and content from the platform consolidation system 303 for use in semantic analyses.

As illustrated, the platform consolidation system 303 includes the PMRS manager 330 and the consolidated PMRS 325, analogous to the PRMS manager 130 and the consolidated PMRS 325 illustrated in FIG. 1A. Each of the distributed development systems 351 can include a local PMRS 363 and a local PMRS manager 370. In some instances, the local PMRS manager 370 may be the same as the application development module 169 described in FIG. 1A. In other instances, the local PMRS manager 370 may be similar to the PMRS manager 130 of FIG. 1B, with the local PMRS manager 370 including some or all of the functionality associated therewith. The platform consolidation system 303 further includes one or more model pre-publishing interfaces 310 which allow the distributed development systems 351 to submit pre-published models to, and access, retrieve, and/or receive pre-published models from the platform consolidation system 303 (as illustrated by arrows 385). As shown by the network boundary lines, each of the illustrated systems may be remote from the others, with the systems using network communications to interact. In some instances, APIs exposed by the platform consolidation system 303 can be accessed by the distributed development systems 351 to both submit pre-published models to and to receive pre-published models from the consolidation system 303. Web services associated with the pre-publishing operations may also be associated with the consolidation system 303 and used instead of APIs. Other means of interaction may also be used as appropriate. Each distributed development system 351 may be able to perform either a local or remote semantic analysis as described above. For local semantic analyses, the analysis and comparison operations may be performed on the local PMRSs 363, while for remote semantic analyses, the information associated with a newly created model, object, or entity can be provided to the platform consolidation system 303, and the analysis can be performed based on the consolidated PMRS 325. Results of the analysis can be stored at or associated with the consolidation system 303. The development systems 351 can access the logged results as illustrated by arrows 390.

In general, the PMRS 325 and PMRS manager 330 offers the possibility to pre-publish the models created in one system to another system. In a pre-publishing step, a model is transferred from the original system in which the model was created to another system. As illustrated in FIG. 3, the other system is the platform consolidation system 303. Pre-publishing can be limited to a metadata-based description of the newly created model, without technical or generated artifacts being transferred. The transferred models can be stored in a secondary storage in some instances, which may exist in parallel to the primary storage containing active models in the platform. Pre-publishing may be performed via web services and/or APIs through which the functionality of platform consolidation system 303 is exposed.

In some instances, the pre-publishing operations may be configured as a mandatory operation in the modeling activity to allow the enforcement of semantic consolidation across the distributed development systems 351. For example, pre-publishing and receiving a negative semantic overlap result (i.e., no significant overlaps identified) may be required prior to activation of a newly created model and the creation of runtime artifacts associated with the newly created model in either the distributed development system 351 or the platform consolidation system 303. If a positive semantic overlap result is returned, the modeling environment or tool may return one or more suggested replacements for use in place of the newly created model that will provide better consistency with pre-existing content. In default configurations, such as those illustrated in FIG. 3, the consolidation system can be defaulted to a system associated with the platform. In alternative implementations, however, a dedicated peer-to-peer consolidation may also be possible. For example, consolidation between a human capital management system and a travel and expense management system may use either of those systems as the consolidation system, where appropriate.

Figure 4:
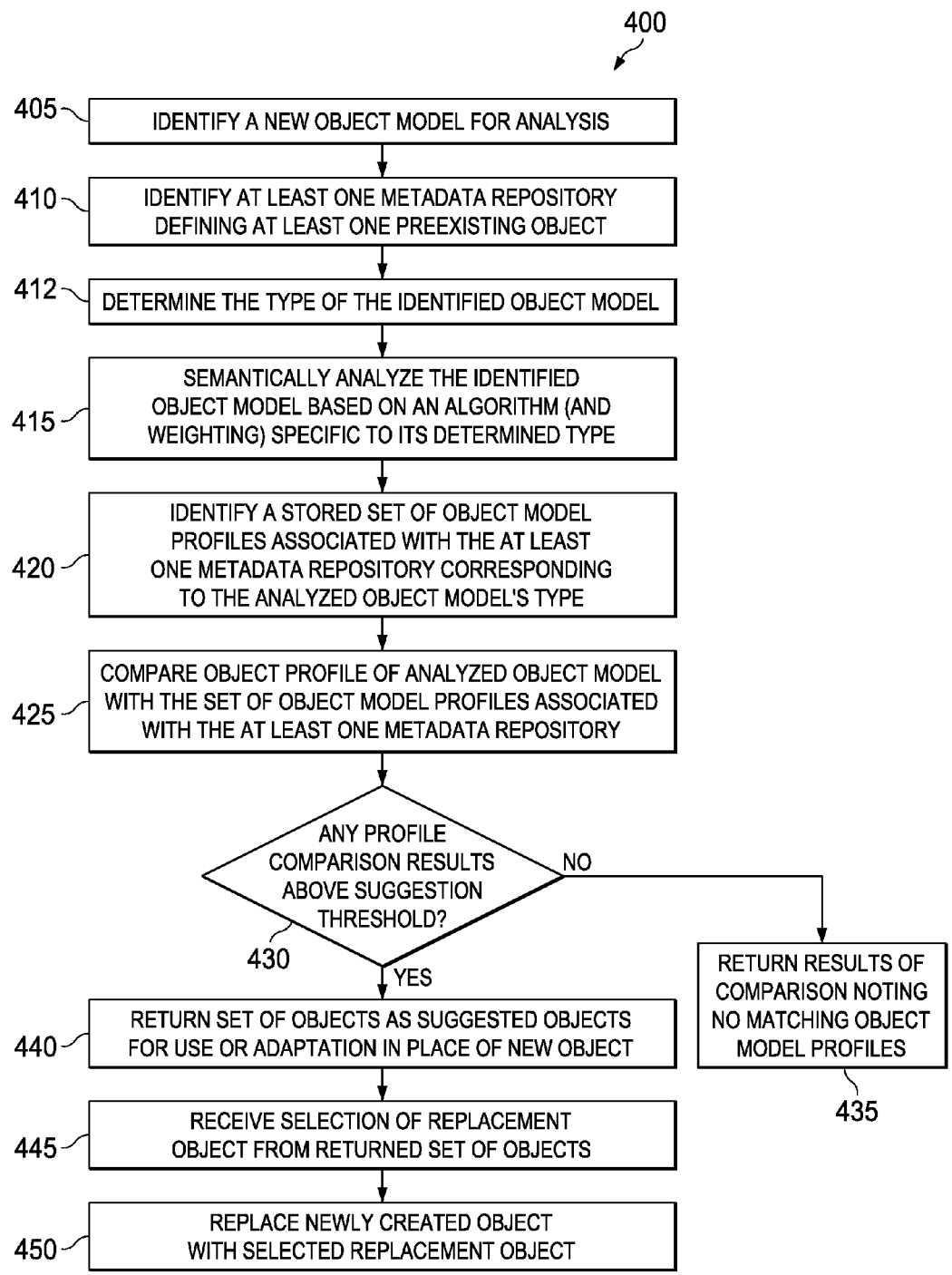
FIG. 4 is a flowchart of an example method 400 for semantically analyzing a newly created object and comparing that object to one or more pre-existing objects.

FIG. 4 is a flowchart of an example method 400 for semantically analyzing a newly created object and comparing that object to one or more pre-existing objects. Method 400 may be performed in a local development system or remotely at a platform consolidation system, as appropriate. For clarity of presentation, the description that follows generally describes method 400 in the context of environment 100 illustrated in FIG. 1A. However, it will be understood that method 400 may be performed, for example, by any other suitable system, environment, or combination of systems and environments, as appropriate.

At 405, a newly created object model is identified for semantic analysis. In some instances, the newly created object model may be an extension or modification of a previously-existing object model. In some instances, the newly created object model may be created for an application or application system based on or associated with a platform application or system. The platform application or system can provide a basis or template for one or more distributed development systems, where related applications based on the platform can be developed. In some instances, a plurality of distributed development systems may be associated with a single platform, allowing for distributed development of multiple derivative applications performing various types of functionality.

At 410, at least one metadata repository defining at least one preexisting object and/or object model is identified. The identified metadata repositories may be local metadata repositories (such as PMRS 163 of FIG. 1A), or they may be a consolidated repository (such as PMRS 125 of FIG. 1A) located at a platform consolidation system where the current set of active and pre-published models may be located.

At 412, a determination is made as to the type of the newly created object identified at 405. The determination of the object type can assist in determining which semantic analysis algorithm to apply to the identified object model, as well as the sets of preexisting and/or pre-published models to which the results of the analysis are to be compared. The type of the newly created object may include a business object, a UI, an inbound or outbound agent, or any other type of object used in the platform. Once a type is determined, at 415 the model associated with the newly created object is semantically analyzed using the type-specific algorithm corresponding to the determined object type. In some instances, an object model profile may be generated for the semantically analyzed object that includes the results of the analysis. In other instances, the results of the analysis may be stored in memory and used in the comparison operations. Examples of the items included in a semantic analysis of a business object model are described above.

At 420, a stored set of object model profiles associated with previously existing and/or pre-published object models within the identified at least one metadata repository are identified. To limit the number of profiles compared to the newly created object model profile, the comparison can be limited to only those profiles of object models corresponding to the determined type of the newly created object model. In other words, if the newly created object model is a business object model, only profiles of other business object models will be included in the comparison.

At 425, the newly created object model's profile is compared with the set of object model profiles identified at 420 from the at least one metadata repository. The comparison can identify overlapping semantics between the newly created object model's profile and the profiles of the pre-existing content. In some instances, different levels of weighting may be assigned to different types of semantic overlap. For example, similar dependent objects may provide a higher weighting than other semantic similarities, such as similarly named actions associated with a particular business object node. Different weighting rules may be applied for different comparisons. Additionally, multiple similar semantics in a particular area of a model may result in a heavier weighted match than if the same number of similar semantics were identified in less related areas.

At 430, a determination is made as to whether the comparison performed at 425 resulted in any pre-existing models meeting or exceeding a suggestion threshold. The suggestion threshold may be predefined, and may represent a defined level of overlap after the semantic analysis is performed. The defined level may be a static number (i.e., a particular profile must overlap by over 50%), or the level may be a dynamic comparison to the entire set of the comparison (i.e., the top 3 results of the comparison are returned). In some instances, no comparison results may exceed the suggestion threshold, and method 400 may continue at 435, where the results of the comparison can be returned, noting that no matching profiles exceeding the suggestion threshold were identified. In some instances, one or more of the top results may be presented. If comparison results do exceed the suggestion threshold, however, method 400 can continue at 440.

At 440, a set of objects that meet the suggestion threshold can be returned, with the set of objects representing suggested replacements for the newly created object. By using those pre-existing objects in place of the newly created object, the semantics of the pre-existing object can be maintained across the various platform-based applications. Further, while the suggestions may not be exact matches, they may be used and adapted in order to provide a similar semantic basis for development. At 445, selection of a particular replacement object from the returned set of objects may be received. If so, at 450 the newly created object can be replaced with the selected replacement object. Alternatively, and not shown, if none of the suggested items in the returned set of objects are returned, the system may allow the developer to request an exception to use the newly created object despite the identified semantic overlap with the pre-existing models.

Figure 5:
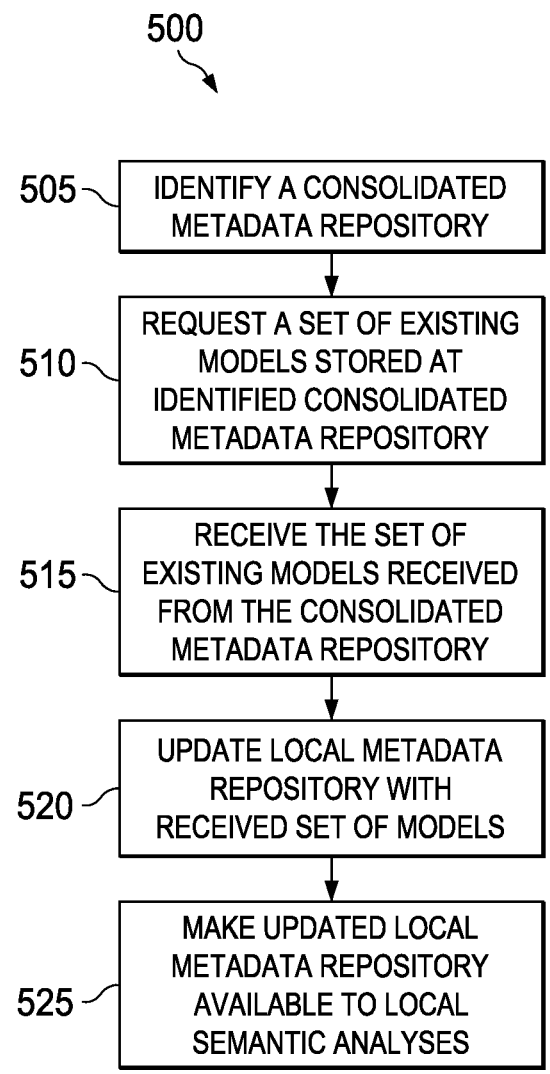
FIG. 5 is a flowchart of an example method 500 for updating a local metadata repository with an updated set of pre-existing and pre-published models and objects from a consolidated metadata repository located at a platform consolidation system.

FIG. 5 is a flowchart of an example method 500 for updating a local metadata repository with an updated set of pre-existing and pre-published models and objects from a consolidated metadata repository located at a platform consolidation system. For clarity of presentation, the description that follows generally describes method 500 in the context of environment 100 illustrated in FIG. 1A. However, it will be understood that method 500 may be performed, for example, by any other suitable system, environment, or combination of systems and environments, as appropriate.

At 505, a consolidated metadata repository is identified. In many instances, the consolidated metadata repository may be associated with a platform consolidation system. However, in some instances, dedicated peer-to-peer consolidation may also be possible, where the consolidated metadata repository may be located at a distributed development system.

At 510, a request for a set of existing and pre-published models stored at the identified consolidated metadata repository may be sent. The request can be sent as a message, accessing an API associated with the consolidated metadata repository (or its platform consolidation system), or through a web service call, among others. At 515, in response to the request, the current set (or a subset thereof) of the existing and pre-published models may be received. In some instances, only those models that were not previously included in the local metadata repository may be returned. In others, all models from the consolidation system may be returned. In still other instances, a particular subset of the pre-existing and pre-published models may be returned. At 520, the local metadata repository is updated with the received set of models. At 525, the updated local metadata repository can be made available to local semantic analyses of newly created objects and their models.

Figure 6:
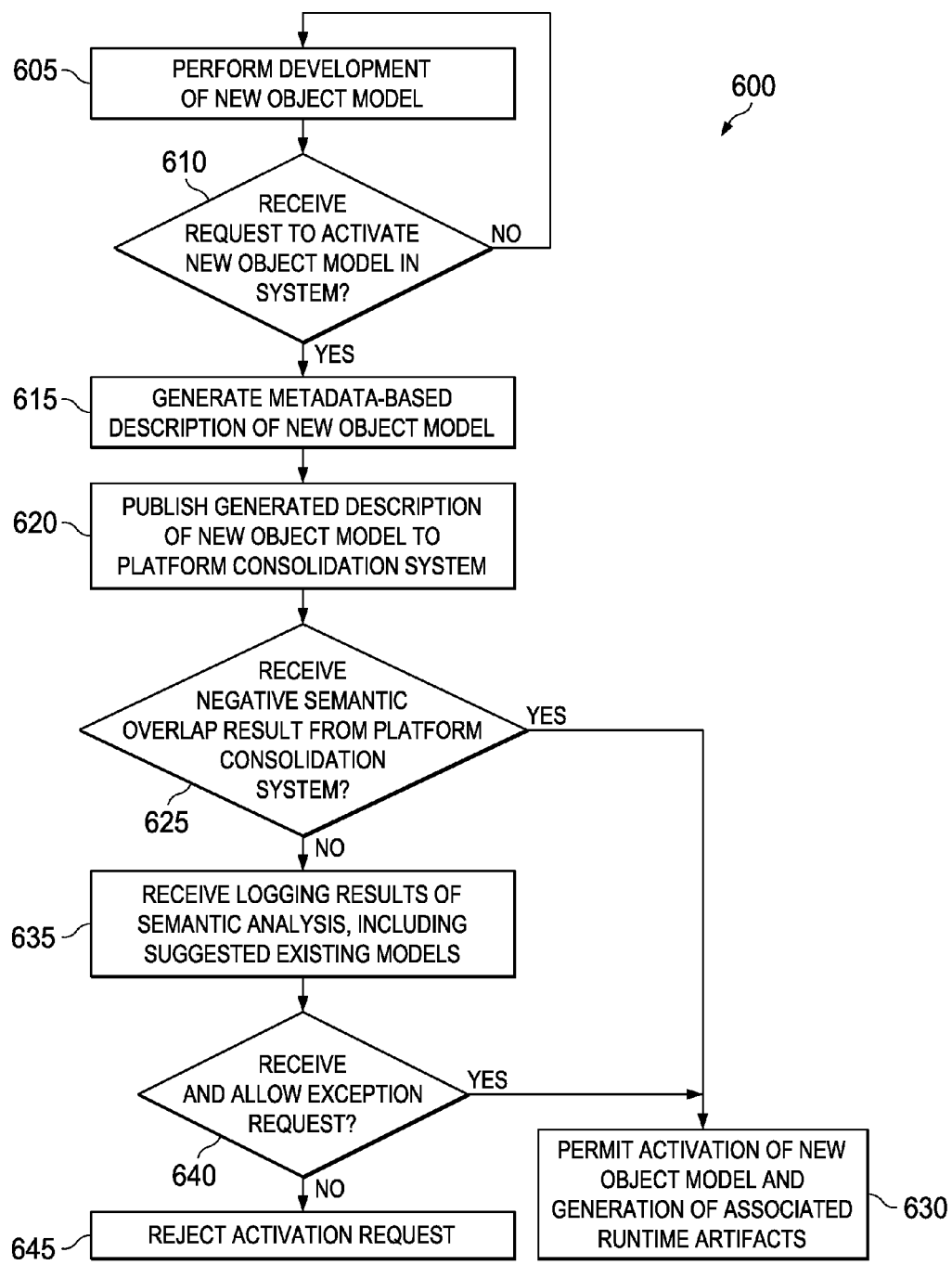
FIG. 6 is a flowchart of an example method 600 for pre-publishing newly created models developed at a distributed development system.

FIG. 6 is a flowchart of an example method 600 for pre-publishing newly created models developed at a distributed development system. For clarity of presentation, the description that follows generally describes method 600 in the context of environment 100 illustrated in FIG. 1A. However, it will be understood that method 600 may be performed, for example, by any other suitable system, environment, or combination of systems and environments, as appropriate.

At 605, development of a new object model is performed at the distributed development system, where the development is based at least in part on a software development platform. In the illustrated example, the pre-publishing operations may be initiated prior to activating a new model or using the new model within the system. At 610, a determination is made as to whether a request to do so is received. If not, method 600 returns to 605. If such a request is received, method 600 continues at 615.

At 615, a metadata-based description of the new object model is generated. In some instances, the entire model may comprise the metadata-based description, while in others, an initial semantic analysis may be performed on the new object model, and the results of that analysis may be generated. In other instances, only a portion of the new object model may be included in the generated description. At 620, the generated description is published to a centralized platform consolidation system. The publishing operations of 620 may be performed by using one or more APIs or other interfaces at the platform consolidation system for submitting pre-published models created at the distributed development systems, by using web services associated with the consolidation system, or other suitable operations.

At 625, a determination is made as to whether a negative semantic overlap result from the platform consolidation system is received. In some instances, when a model is pre-published to the platform consolidation system, the platform consolidation system may perform a semantic analysis on the received model to identify whether significant semantic overlap occurs between the new model and any pre-existing models included in the consolidated metadata repository. The results of that analysis can be returned to the distributed development system, along with any identified suggested replacements. If a negative semantic overlap result is received from the platform consolidation system, method 600 continues at 630, where the activation of the new object model is permitted at the distributed development environment. If, however, a positive overlap result is not returned, method 600 continues to 635.

At 635, the logged results of the semantic analysis, possibly including one or more suggested pre-existing models to be used instead, are received. In some instances, regardless of the semantic overlap, the developer may wish to use the newly created object. If so, the developer may request an exception to allow the new object model to be activated. In some instances, the request may be automatically submitted, while in others, the developer may manually submit the request. At 640, a determination is made as to whether an exception request is received and allowed. If not, method 600 moves to 645 where the activation request is rejected. In some instances, the developer may be able to select one of the suggested pre-existing models for use in lieu of the new object model. If, however, an exception request is received and allowed, method 600 continues to 630, where the new object model is permitted to be activated.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for semantically analyzing modeled objects, the method comprising:

identifying an object model created in a distributed development system for semantic analysis, where the distributed development system is associated with a software platform, and wherein the object model is created for an application or an application system based on or associated with the software platform, wherein the software platform provides a common metadata-based modeling methodology for associated applications;

semantically analyzing the identified object model based on a predetermined algorithm wherein the predetermined algorithm is based at least in part on an object model type of the identified object model;

comparing a set of at least one pre-existing object models associated with the software platform to the semantically analyzed object model;

determining a level of semantic overlap between the semantically analyzed object model and each of the set of at least one pre-existing object models;

determine whether a level of semantic overlap between the semantically analyzed object model and each of the set of at least one pre-existing object models exceeds a predefined level of semantic overlap; and present at least a subset of the pre-existing object models having a level of semantic overlap with the semantically analyzed object model exceeding the predefined level of semantic overlap, wherein the subset of the pre-existing object models represent suggested replacements for the identified object model.

2. The method of claim 1, wherein the set of at least one pre-existing object models comprises a subset of pre-existing object models available in a development system.

3. The method of claim 2, wherein the set of at least one pre-existing object models compared to the semantically analyzed object model comprises a subset of the set of pre-existing object models available in the distributed development system, where the subset comprises the pre-existing object models available in the distributed development system that are the same object model type of the identified object model.

4. The method of claim 1, wherein the set of at least one pre-existing object models comprises a set of object models defined in the software platform and at least one object model originally defined in the distributed development system, where the distributed development system is derived and separate from the software platform.

5. The method of claim 1, wherein semantically analyzing the identified object model based on the predetermined algorithm includes sending the identified object model from the distributed development system to a platform consolidation system for a remote semantic analysis, the platform consolidation system associated with a consolidated metadata repository for platform-related object models;
wherein comparing the set of at least one pre-existing object models to the semantically analyzed object model is performed at the platform consolidation system, wherein the set of at least one pre-existing object models comprises at least a subset of a platform metadata repository; and
wherein determining a level of semantic overlap between the semantically analyzed object model and each of the set of at least one pre-existing object models includes receiving results of the remote semantic analysis from the platform consolidation system, the results including a set of semantic overlap results between the identified object model and the set of at least one pre-existing object models from the platform metadata repository.

6. The method of claim 1, further comprising:
publishing the semantically analyzed object model to a platform metadata repository at a platform consolidation system, where the platform metadata repository consolidates metadata definitions of object models defined in the software platform and in at least one distributed development system.

7. The method of claim 6, further comprising:
receiving at least one metadata definition of an object model defined outside the local distributed development system; and
adding the received at least one metadata definition of the object model into a local repository storing a set of metadata definitions of object models based on the software platform.

8. The method of claim 7, wherein receiving the at least one metadata definition of the object model defined outside the local distributed development system includes receiving the at least one metadata definition of the object model directly from a remote distributed development system.

9. The method of claim 1, further comprising:
receiving a selection of a particular pre-existing object model from the presented subset; and
replace the identified object model with the selected pre-existing object model in the distributed development system.

10. A computer program product for semantically analyzing modeled objects, the computer program product comprising computer readable instructions embodied on tangible, non-transitory media, the instructions operable when executed to:
identify an object model created in a distributed development system for semantic analysis, where the distributed development system is associated with a software platform, and wherein the object model is created for an application or an application system based on or associated with the software platform, wherein the software platform provides a common metadata-based modeling methodology for associated applications;
semantically analyze the identified object model based on a predetermined algorithm, wherein the predetermined algorithm is based at least in part on an object model type of the identified object model;
compare a set of at least one pre-existing object models associated with the software platform to the semantically analyzed object model;
determine a level of semantic overlap between the semantically analyzed object model and each of the set of at least one pre-existing object models;
determine whether a level of semantic overlap between the semantically analyzed object model and each of the set of at least one pre-existing object models exceeds a predefined level of semantic overlap; and
present at least a subset of the pre-existing object models having a level of semantic overlap with the semantically analyzed object model exceeding the predefined level of semantic overlap, wherein the subset of the pre-existing object models represent suggested replacements for the identified object model.

11. The product of claim 10, wherein the set of at least one pre-existing object models comprises a subset of pre-existing object models available in a development system.

12. The product of claim 11, wherein the set of at least one pre-existing object models compared to the semantically analyzed object model comprises a subset of the set of pre-existing object models available in the distributed development system, where the subset comprises the pre-existing object models available in the distributed development system that are the same object model type of the identified object model.

13. The product of claim 10, wherein the set of at least one pre-existing object models comprises a set of object models defined in the software platform and at least one object model originally defined in the distributed development system, where the distributed development system is derived and separate from the software platform.

14. The product of claim 13, where the distributed development system is a first distributed development system, and wherein the set of at least one pre-existing object models further comprises at least one object model originally defined in a second distributed development system, where the second distributed development system is derived from the software platform, and is further separate from the first distributed development system and the software platform.

15. The product of claim 14, wherein the first distributed development system and the second distributed development system comprise distributed development systems both based on a single platform system.

16. The product of claim 10, wherein semantically analyzing the identified object model based on the predetermined algorithm includes sending the identified object model from the distributed development system to a platform consolidation system for a remote semantic analysis, the platform consolidation system associated with a consolidated metadata repository for platform-related object models;

wherein comparing the set of at least one pre-existing object models to the semantically analyzed object model is performed at the platform consolidation system, wherein the set of at least one pre-existing object models comprises at least a subset of a platform metadata repository; and wherein determining a level of semantic overlap between the semantically analyzed object model and each of the set of at least one pre-existing object models includes receiving results of the remote semantic analysis from the platform consolidation system, the results including a set of semantic overlap results between the identified object model and the set of at least one pre-existing object models from the platform metadata repository.

17. The product of claim 10, further comprising:
publishing the semantically analyzed object model to a platform metadata repository at a platform consolidation system, where the platform metadata repository consolidates metadata definitions of object models defined in the software platform and in at least one distributed development system.

18. The product of claim 17, further comprising:
receiving at least one metadata definition of an object model defined outside the local distributed development system; and adding the received at least one metadata definition of the object model into a local repository storing a set of metadata definitions of object models based on the software platform.

19. The product of claim 18, wherein receiving the at least one metadata definition of the object model defined outside the local distributed development system includes receiving the at least one metadata definition of the object model directly from a remote distributed development system.

20. The product of claim 18, wherein receiving the at least one metadata definition of the object model defined outside the local distributed development system includes receiving the at least one metadata definition of the object model from the platform metadata repository at a platform consolidation system.

21. The product of claim 10, wherein the identified object model is one of a business object model, a user interface model, an inbound agent model, or an outbound agent model.

22. The product of claim 10, the instructions further operable when executed to:
receive a selection of a particular pre-existing object model from the presented subset; and
replace the identified object model with the selected pre-existing object model in the distributed development system.

23. A system comprising:
one or more computers; and
a computer-readable medium coupled to the one or more computers having instructions stored thereon which, when executed by the one or more computers, cause the one or more computers to perform operations comprising:
identifying an object model created in a distributed development system for semantic analysis, where the distributed development system is associated with a software platform, and wherein the object model is created for an application or an application system based on or associated with the software platform, wherein the software platform provides a common metadata-based modeling methodology for associated applications;
semantically analyzing the identified object model based on a predetermined algorithm, wherein the predetermined algorithm is based at least in part on an object model type of the identified object model;
comparing a set of at least one pre-existing object models associated with the software platform to the semantically analyzed object model;
determining a level of semantic overlap between the semantically analyzed object model and each of the set of at least one pre-existing object models;
determining whether a level of semantic overlap between the semantically analyzed object model and each of the set of at least one pre-existing object models exceeds a predefined level of semantic overlap; and
presenting at least a subset of the pre-existing object models having a level of semantic overlap with the semantically analyzed object model exceeding the predefined level of semantic overlap, wherein the subset of the pre-existing object models represent suggested replacements for the identified object model.

24. The system of claim 23, the instructions causing one or more computers to perform operations further comprising:
receiving a selection of a particular pre-existing object model from the presented subset; and
replace the identified object model with the selected pre-existing object model in the distributed development system.

* * * * *